(12) United States Patent
Vandanapu et al.

(10) Patent No.: US 9,733,102 B2
(45) Date of Patent: Aug. 15, 2017

(54) NAVIGATION SYSTEM WITH RESOURCE CONTROL MECHANISM AND METHOD OF OPERATION THEREOF

(71) Applicant: Telenav, Inc., Sunnyvale, CA (US)

(72) Inventors: Naveen Kumar Vandanapu, Sunnyvale, CA (US); Gregory Stewart Aist, San Mateo, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/596,590

(22) Filed: Jan. 14, 2015

(65) Prior Publication Data

US 2016/0202082 A1 Jul. 14, 2016

(51) Int. Cl.
*G01C 21/36* (2006.01)

(52) U.S. Cl.
CPC ..... *G01C 21/3697* (2013.01); *G01C 21/3641* (2013.01)

(58) Field of Classification Search
CPC ............ G01C 21/3626; G01C 21/3469; G01C 21/3641; G01C 21/3697; H04M 1/72569
See application file for complete search history.

(56) References Cited

U.S. PATENT DOCUMENTS

| | | | |
|---|---|---|---|
| 8,260,541 B2 | 9/2012 | Suzuki | |
| 8,655,307 B1* | 2/2014 | Walker | H04W 52/0212 455/343.5 |
| 2009/0164115 A1* | 6/2009 | Kosakowski | G01C 21/3641 701/533 |
| 2011/0054775 A1 | 3/2011 | Snyder | |
| 2012/0022904 A1* | 1/2012 | Mason | G01C 21/3469 705/7.13 |

* cited by examiner

*Primary Examiner* — Yuen Wong
(74) *Attorney, Agent, or Firm* — IP Investment Law Group (57) ABSTRACT

A method of operation of a navigation system includes: determining a travel profile including a navigation complexity; determining a display status with a control unit based on the travel profile; determining a resource prediction based on the navigation complexity; and updating the display status based on the resource prediction for presenting a navigation content on a device.

20 Claims, 6 Drawing Sheets

NAVIGATION SYSTEM WITH RESOURCE CONTROL MECHANISM AND METHOD OF OPERATION THEREOF

TECHNICAL FIELD

The present invention relates generally to a navigation system, and more particularly to a system with resource control mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without resource control mechanism to efficiently manage device resource has become a paramount concern for the consumer. The inability to control resources decreases the benefit of using the tool.

Thus, a need still remains for a navigation system with resource control mechanism to manage resource efficiently for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel profile including a navigation complexity; determining a display status with a control unit based on the travel profile; determining a resource prediction based on the navigation complexity; and updating the display status based on the resource prediction for presenting a navigation content on a device.

The present invention provides a navigation system, including: a control unit for: determining a travel profile including a navigation complexity, determining a display status with a control unit based on the travel profile, determining a resource prediction based on the navigation complexity, updating the display status based on the resource prediction, and a communication interface, coupled to the control unit, for communicating the display status for presenting a navigation content on a device.

The present invention provides a navigation system including a non-transitory computer readable medium including instructions for execution, the instructions comprising: determining a travel profile including a navigation complexity; determining a display status based on the travel profile; determining a resource prediction based on the navigation complexity; and updating the display status based on the resource prediction for presenting a navigation content on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Figure 1:
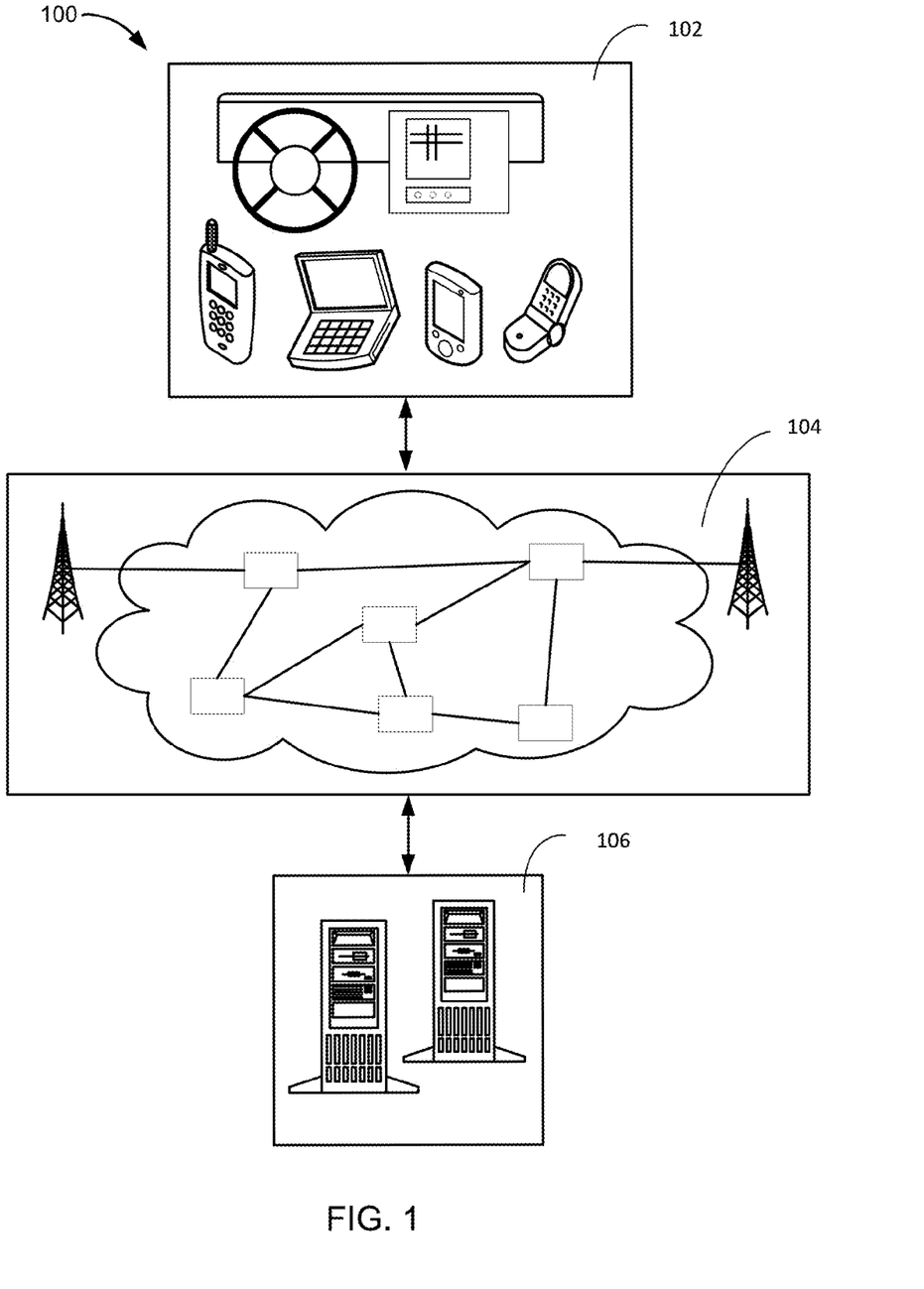
FIG. 1 is a navigation system with resource control mechanism in an embodiment of the present invention.

Referring now to FIG. 1, therein is shown a navigation system 100 with resource control mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
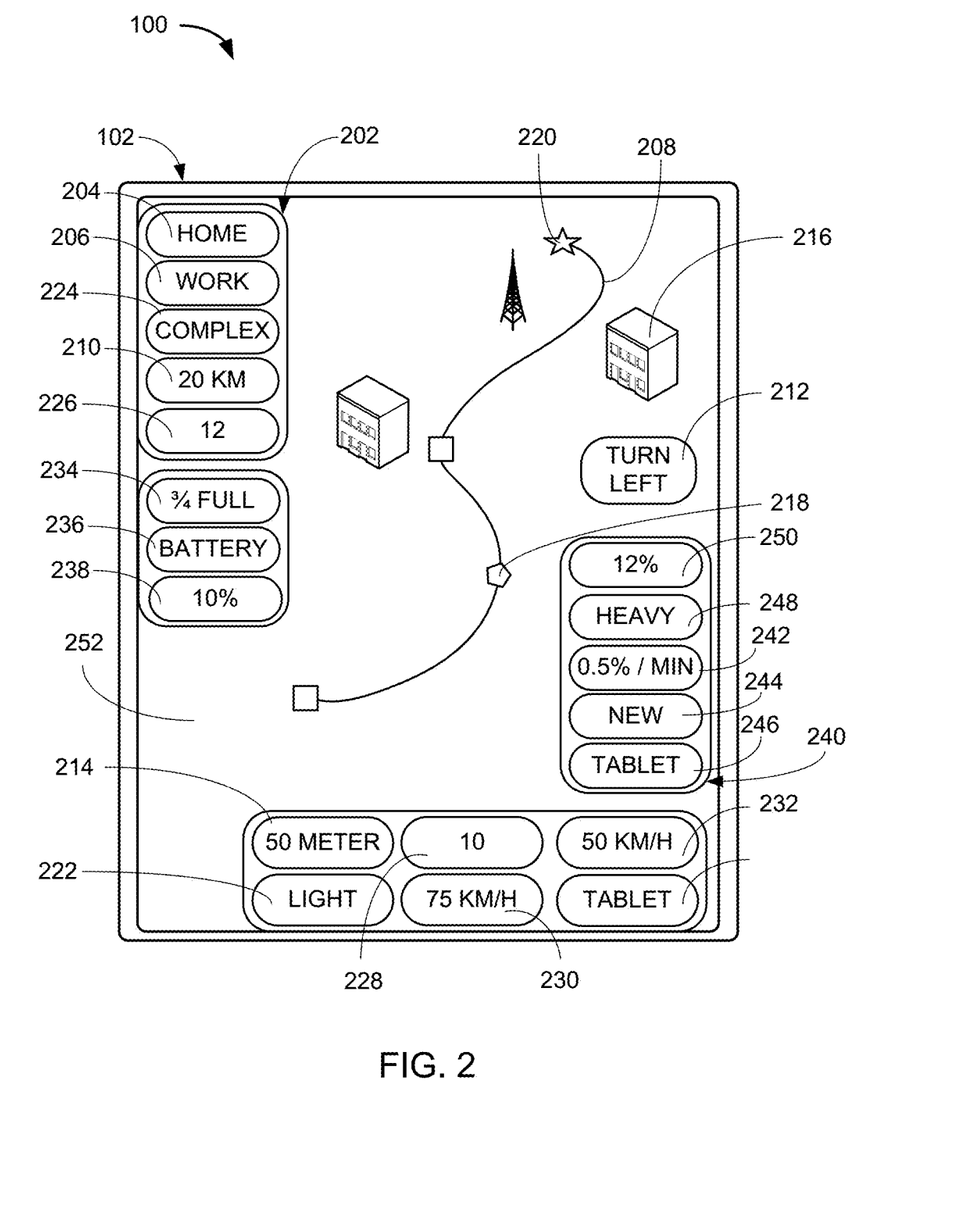
FIG. 2 is an example of a travel profile.

Referring now to FIG. 2, there is shown an example of a travel profile 202. For clarity and brevity, the discussion of the embodiment of the present invention focuses on the first device 102 delivering the result generated by the navigation system 100. However, various embodiments of the present invention can easily be applied with the description with the second device 106 of FIG. 1 and the first device 102 interchangeably.

The travel profile 202 is defined as a set of characteristics for a user's travel. For example, the travel profile 202 can include a start location 204, a waypoint 206, or a combination thereof. The start location 204 is defined as a physical location or a representation of a physical location where the user's travel begins. The waypoint 206 is defined as a physical location or a representation of a physical location where the user's travel stops. For example, the waypoint 206 can include an intermediate stop point prior to reaching a target destination, which can represent the endpoint of the user's travel. The waypoint 206 can also represent the target destination.

A travel route 208 is defined as a path for the user's travel. For example, the travel route 208 can start from the start location 204 and end at the waypoint 206. A travel distance 210 can represent a physical distance. For example, the travel distance 210 can represent the physical distance between the start location 204 to the waypoint 206. For another example, the travel distance 210 can represent the physical distance between an instance of a navigation maneuver 212 to another instance of the navigation maneuver 212. For further example, the travel distance 210 can represent a Euclidean distance, a physical distance incorporating the altitude of the travel route 208, or the physical distance for traveling along the travel route 208.

A distance threshold 214 is defined as a distance limit for traveling along the travel route 208. For example, the distance threshold 214 can represent a length of physical distance between two physical locations before the navigation system 100 invokes an action. For a specific example, the distance threshold 214 can represent 60 meters for a physical distance between two instances of the navigation maneuver 212. The navigation maneuver 212 is defined as user's action for traversing the travel route 208. For example, the navigation maneuver 212 can include going straight, turning right, turning left, U-turn, or a combination thereof.

The navigation system 100 can present the navigation maneuver 212 as part of a navigation content 216 on the first device 102. The navigation content 216 is defined as information to guide the user's travel. More specifically as an example, the navigation content 216 can include a plurality of the navigation maneuver 212 to guide the user to reach the waypoint 206.

The navigation system 100 can provide a variety of the navigation content 216 to aid the user's travel. For example, the navigation content 216 can include a current location 218, a future location 220, or a combination thereof. The current location 218 is defined as a physical location or a representation of the physical location of the first device 102 currently detected. The future location 220 is defined as a physical location or a representation of the physical location of the first device 102 in future time. More specifically as an example, the current location 218 can represent the start location 204 and the future location 220 can represent the waypoint 206 that the user is planning to travel to.

The navigation system 100 can also provide a traffic condition 222 of the travel route 208 as part of the navigation content 216. The traffic condition 222 can represent the flow of traffic of a geographic region. For example, the traffic condition 222 can represent congestion, accident, weather hazard, no traffic, or a combination thereof.

The navigation content 216 can also include a navigation complexity 224 of the travel route 208 for example. The navigation complexity 224 is defined as an intricacy level of the user's travel. More specifically as an example, the navigation complexity 224 can be determined based on whether a turn count 226 meets or exceeds the turn threshold 228. The turn count 226 is defined as a number of turns. For example, the turn count 226 can represent a number of turns on the travel route 208, the travel distance 210 between instances of the navigation maneuver 212, within the distance threshold 214, or a combination thereof. The turn threshold 228 is defined as a limit for a number of turns.

A travel speed 230 is defined as a rapidity of the user's travel. For example, the travel speed 230 can represent 100 kilometers per hour. A speed threshold 232 is defined as a speed limit. For example, the speed threshold 232 can represent a maximum or minimum speed that first device 102 can reach before the navigation system 100 invokes an action.

The navigation system 100 can track a resource level 234, which is defined as a supply level to operate the first device 102. For example, the resource level 234 can represent a charge level of a device resource 236 representing a battery. The device resource 236 can represent the source of energy to operate the first device 102. A resource threshold 238 is defined as a resource limit. For example, if the resource level 234 is below the resource threshold 238, the first device 102 can turn off because the device resource 236 can no longer supply the energy to operate the first device 102.

A consumption profile 240 is defined as a set of characteristics for how the device resource 236 is depleted. For example, the consumption profile 240 can include a consumption rate 242, a resource age 244, a device type 246, a usage pattern 248, or a combination thereof. The consumption rate 242 is defined as a degree of how fast the first device 102 depletes the device resource 236 from the user's use of the first device 102. The resource age 244 is defined as how old the device resource 236 is. The device type 246 is defined as a classification of the first device 102. For example, the device type 246 can include a mobile device, non-mobile device, or a combination thereof. The usage pattern 248 is defined as a user's tendency for operating the first device 102. For example, the usage pattern 248 can represent an activity history for using the first device 102.

The navigation system 100 can generate a resource prediction 250 to predict the resource level 234. The resource prediction 250 is defined as a forecast of the resource level 234. For example, the resource prediction 250 can represent the resource level 234 for the future location 220.

A travel context 252 is defined as a situation or condition surrounding the first device 102. For example, the travel context 252 can include the traffic condition 222 of the current location 218. For another example, the travel context 252 can include the navigation complexity 224 of the travel route 208 where the user is currently traversing.

Figure 3:
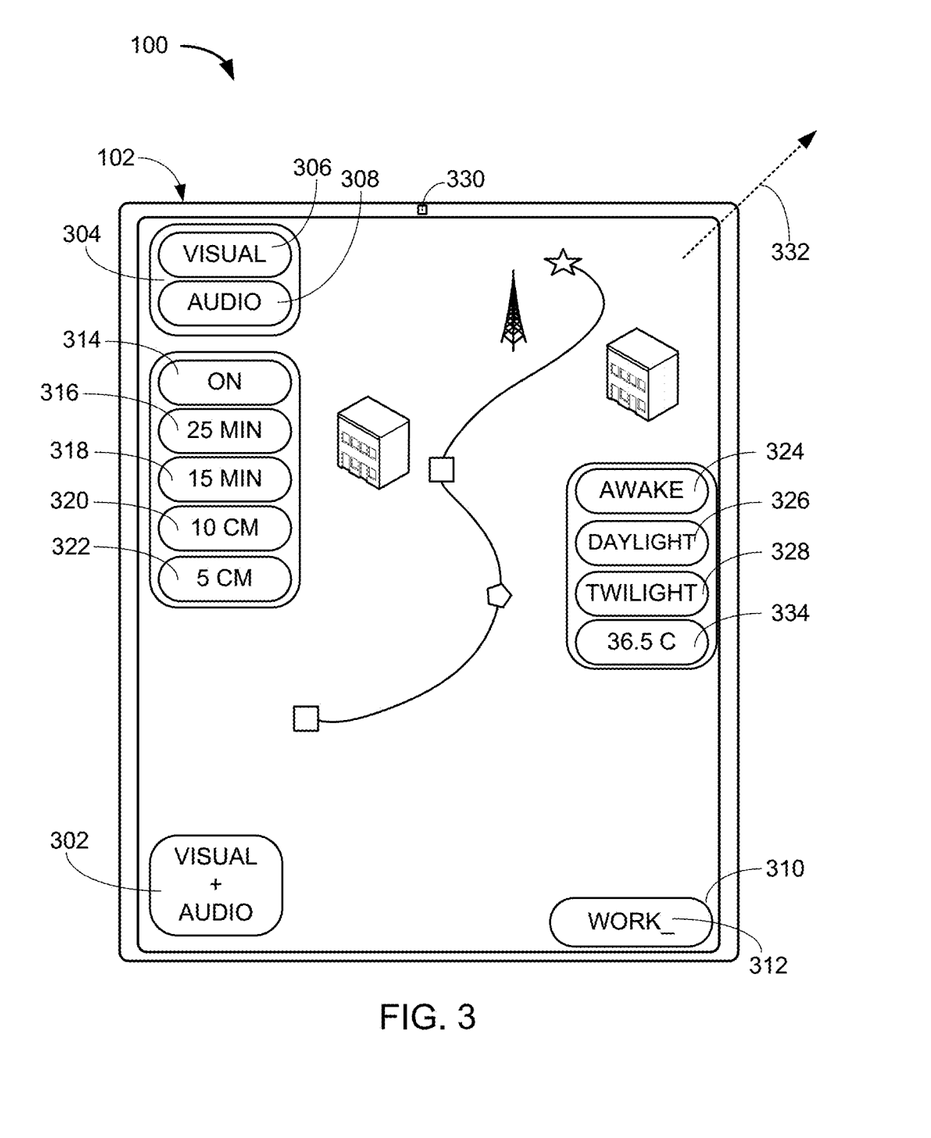
FIG. 3 is an example of a navigation mode.

Referring now to FIG. 3, there is shown an example of a navigation mode 302. The navigation mode 302 is defined as a particular navigation form for delivering the navigation content 216 of FIG. 2. For example, the navigation mode 302 can include a variety of a mode type 304 including a display mode 306, an audio mode 308, or a combination thereof. The mode type 304 is defined as a classification of the navigation mode 302. The display mode 306 is defined as the mode type 304 for presenting a visual instance of the navigation content 216. The audio mode 308 is defined as the mode type 304 for presenting an audio instance only for the navigation content 216.

The first device 102 can receive a user entry 310 based on a gesture type 312. A user entry 310 is defined as an input into the first device 102. For example, the user entry 310 can include a manual input, an oral input, or a combination thereof. The gesture type 312 is a classification of the user entry 310. For example, the gesture type 312 can represent a movement performed on the first device 102. More specifically as an example, the gesture type 312 can include a manual input, such as typing on the display interface, picking up the first device 102, or a combination thereof.

A display status 314 when the first device 102 is in the display mode 306 can change due to various factors. The display status 314 is defined as state of a display interface of a device. For example, the display status 314 can represent "on" if the display interface of the first device 102 is displaying the navigation content 216. In contrast, the display status 314 can represent "off" if the display interface of the first device 102 is turned off, thus, the navigation content 216 is not viewable.

A display time 316 is defined as a duration for keeping the display status 314 as "on." A predefined time 318 is defined as a set duration for keeping the display status 314 as "on." The display time 316 can change based on the travel profile 202 of FIG. 2.

A user distance 320 is defined as a physical distance between the user and the first device 102. The proximity threshold 322 is defined as a distance limit between the user and the first device 102. For example, if the user distance 320 is within the proximity threshold 322, the navigation system 100 can change the display status 314 from "on" to "off."

A user's bioindicator 334 is defined as information provided by the user's body. For example, the user's bioindicator 334 can include an electric field emitted from the user's body, the user's body heat, the user's voice, the user's heartbeat, or a combination thereof. A user's condition 324 is defined as the user's state. For example, the user's condition 324 can include whether the user is awake or asleep. For further example, the user's condition 324 can include whether the user is alert or day dreaming.

A luminosity level 326 is defined as a level of brightness. A luminosity threshold 328 is defined as a brightness limit. For example, the navigation system 100 can update the display status 314 based on whether the luminosity level 326 meets, exceeds, or below the luminosity threshold 328.

The navigation system 100 can include a detecting sensor 330 to detect the factors discussed above. The detecting sensor 330 is defined as a device that captures the travel context 252 of FIG. 2 of the first device 102.

A content display 332 is defined as an outcome of having the navigation content 216 displayed. For example, if the display status 314 is "on," the content display 332 represents "displayed." Moreover, the navigation system 100 can transfer the content display 332 from one device to another device for displaying the navigation content 216.

Figure 4:
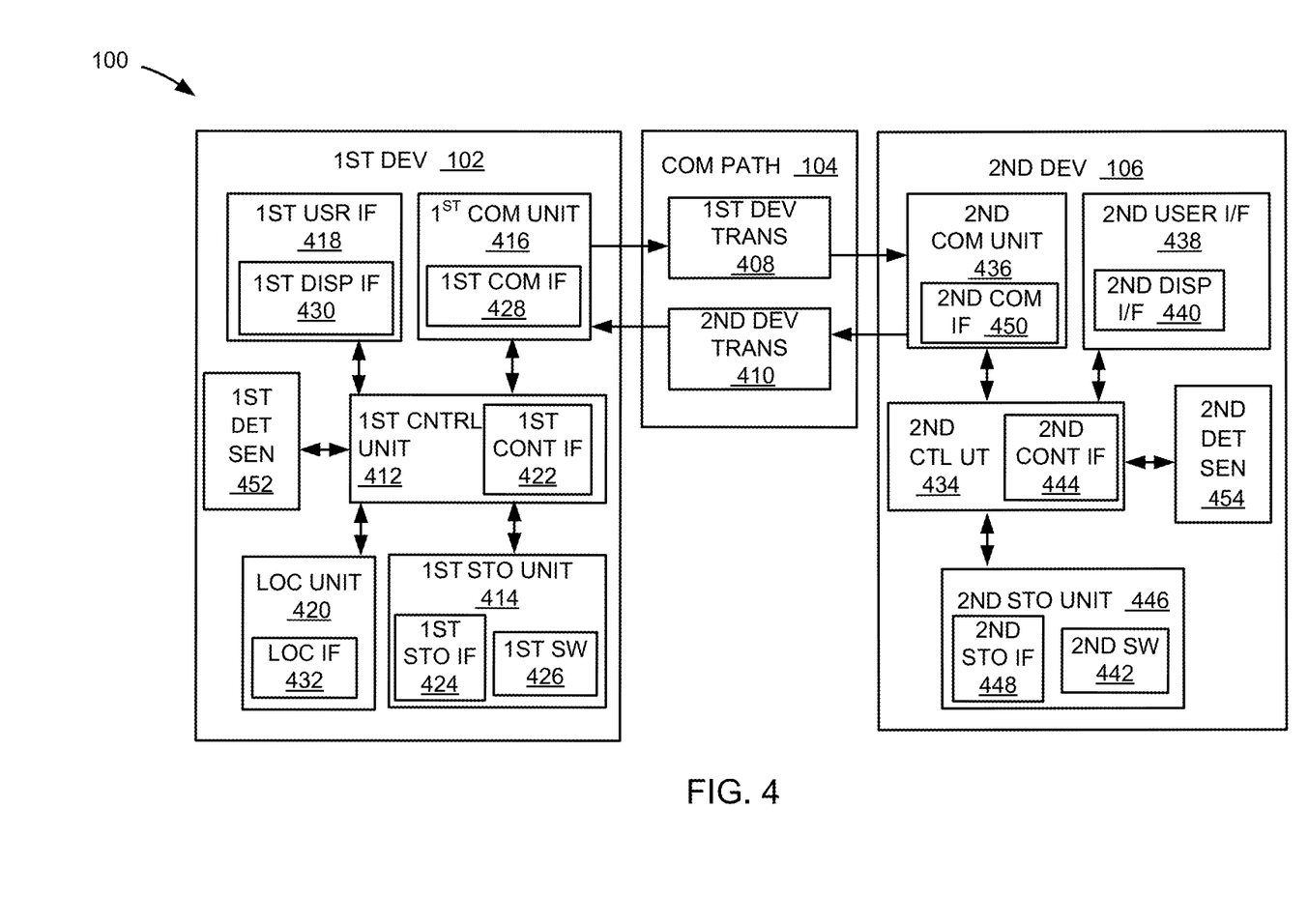
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a micro-electromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

A first detecting sensor 452 can represent the detecting sensor 330 of FIG. 3. Examples of the first detecting sensor 452 can include a digital camera, video camera, thermal camera, night vision camera, infrared camera, x-ray camera, or the combination thereof. Examples of the first detecting sensor 452 can include accelerometer, thermometer, microphone, wireless signal receiver, remote physiological monitoring device, light identifier, or the combination thereof.

A second detecting sensor 454 can represent the detecting sensor 330 of FIG. 3. Examples of the second detecting sensor 454 can include a digital camera, video camera, thermal camera, night vision camera, infrared camera, x-ray camera, or the combination thereof. Examples of the second detecting sensor 454 can include accelerometer, thermometer, microphone, wireless signal receiver, remote physiological monitoring device, light identifier, or the combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
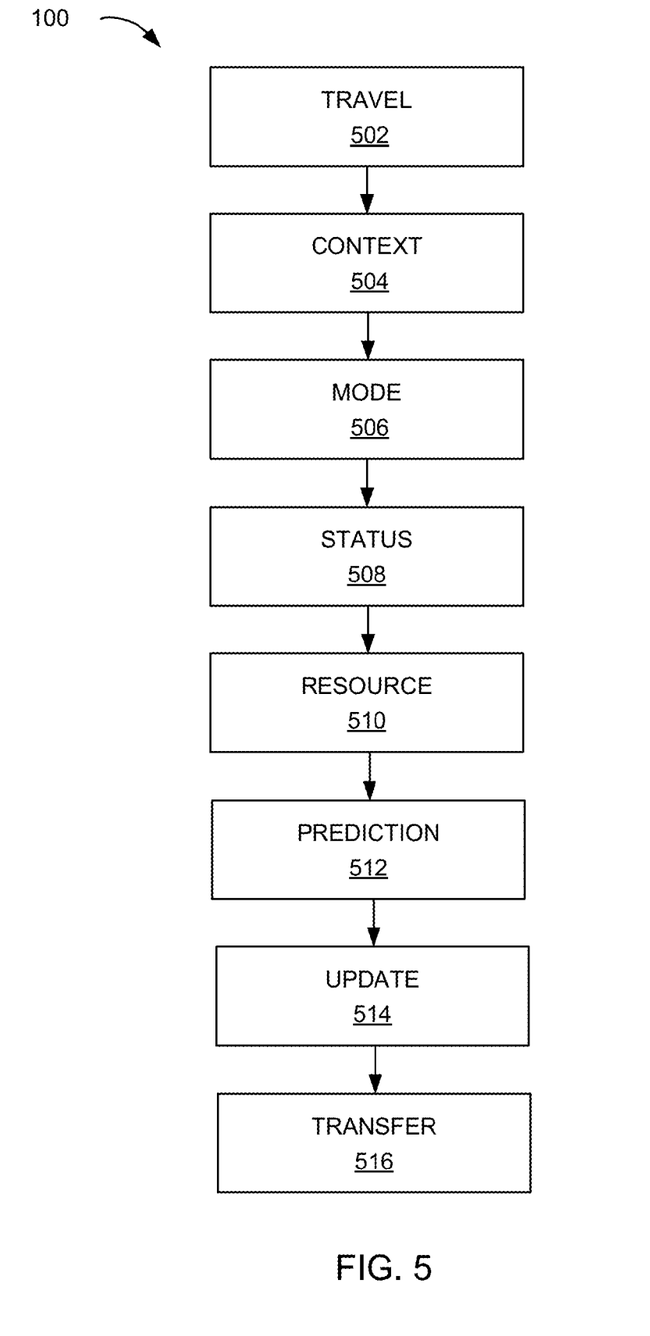
FIG. 5 is a control flow of the navigation system.

Referring now to FIG. 5, therein is shown a control flow of the navigation system 100. The navigation system 100 can include a travel module 502. The travel module 502 determines the travel profile 202 of FIG. 2. For example, the travel module 502 can determine the travel profile 202 based on the travel route 208 of FIG. 2 from the start location 204 of FIG. 2 to the waypoint 206 of FIG. 2.

The travel module 502 can determine the travel profile 202 in a number of ways. For example, the travel module 502 can determine the travel profile 202 based on the navigation complexity 224 of FIG. 2 of the travel route 208 from the start location 204 to the waypoint 206. More specifically, the travel module 502 can determine the navigation complexity 224 based on the comparison of the turn count 226 of FIG. 2 to the turn threshold 228 of FIG. 2. For example, the travel module 502 can determine the navigation complexity 224 of "complex" based on the turn count 226 meeting or exceeding the turn threshold 228.

For further example, the travel module 502 can determine the navigation complexity 224 based on the turn count 226 meeting or exceeding the turn threshold 228 within the travel distance 210 of FIG. 2. More specifically, the turn threshold 228 can be increased or decreased based on the travel distance 210. As an example, the turn threshold 228 can be increased relative to the increase in the travel distance 210. And the turn threshold 228 can be decreased relative to decrease in the travel distance 210.

In contrast, the travel module 502 can determine the navigation complexity 224 of "simple" based on the turn count 226 below the turn threshold 228. The travel module 502 can communicate the travel profile 202 to a context module 504.

It has been discovered that the navigation system 100 determining the navigation complexity 224 based on the turn count 226 meeting or exceeding the turn threshold 228 within the travel distance 210 improves the safety of operating the navigation system 100, the first device 102, the vehicle, or a combination thereof. By determining the navigation complexity 224, the navigation system 100 can anticipate whether to present the navigation content 216 or not. As a result, the navigation system 100 can improve the delivery of the navigation content 216 of FIG. 2 for safer operation of the navigation system 100, the first device 102, the vehicle, or a combination thereof.

The navigation system 100 can include the context module 504, which can couple to the travel module 502. The context module 504 determines the travel context 252 of FIG. 2. For example, the context module 504 can determine the travel context 252 based on the travel profile 202.

The context module 504 can determine the travel context 252 in a number of ways. For example, the travel profile 202 can include the travel route 208 for the user traversing through a curvy road in a mountainous region. Furthermore, the travel profile 202 can indicate that the navigation complexity 224 as "complex." Based on the travel profile 202, the context module 504 can determine the travel context 252 that requires to user to require the navigation content 216 to inform the user of the next travel sequence.

For a different example, the context module 504 can determine the travel context 252 based on the current location 218 of FIG. 2, the travel route 208, or a combination thereof. More specifically, the current location 218 can indicate that the user is stopped at a traffic light. The travel route 208 can indicate that the user will make the navigation maneuver 212 of FIG. 2 representing a U-turn. Based on the current location 218 and the travel route 208, the context module 504 can determine the travel context 252 of user requiring the navigation content 216 after making the U-turn.

For another example, the context module 504 can determine the travel context 252 based on the navigation complexity 224. The navigation complexity 224 can represent "simple." As a result, the context module 504 can determine the travel context 252 that the user can stop using the navigation system 100 for obtaining the navigation content 216. The context module 504 can communicate the travel context 252 to a mode module 506.

The navigation system 100 can include the mode module 506, which can couple to the context module 504. The mode module 506 determines the navigation mode 302 of FIG. 3. For example, the mode module 506 can determine the navigation mode 302 based on the mode type 304 of FIG. 3.

The mode module 506 can determine the navigation mode 302 in a number of ways. For example, the mode module 506 can determine the navigation mode 302 based on the mode type 304 including the display mode 306 of FIG. 3, the audio mode 308 of FIG. 3, or a combination thereof. More specifically, if the user of the navigation system 100 with only the navigation content 216 of audio output, the mode module 506 can determine the navigation mode 302 is in the mode type 304 representing the audio mode 308. In contrast, if the user is using the navigation system 100 with the navigation content 216 including a visual output, an audio output, or a combination thereof, the mode module 506 can determine the navigation mode 302 is in the mode type 304 representing the display mode 306.

For further example, the mode module 506 can determine the navigation mode 302 based on the travel context 252. Continuing with the previous example, the travel context 252 can represent the user requiring the navigation content 216 based on the navigation complexity 224 representing "complex." As a result, the mode module 506 can determine the navigation mode 302 to represent the display mode 306 to visually aid the user for traversing the travel route 208 in addition to audio aid.

For a different example, the navigation complexity 224 can represent "simple." As a result, the mode module 506 can determine the navigation mode 302 to represent the audio mode 308 to audibly aid the user for traversing the travel route 208. More specifically, the display mode 306 may be unnecessary and the audio mode 308 can provide sufficient information of the navigation content 216 due to the simplicity of the navigation complexity 224. The mode module 506 can communicate the navigation mode 302 to a status module 508.

The navigation system 100 can include the status module 508, which can couple to the mode module 506. The status module 508 determines the display status 314 of FIG. 3. For example, the status module 508 can determine the display status 314 based on the navigation mode 302.

The status module 508 can determine the display status 314 in a number of ways. For example, the status module 508 can determine the display status 314 based on the navigation mode 302 representing the audio mode 308. As discussed above, if the navigation mode 302 represents the audio mode 308, the navigation content 216 can represent only the audio output. As a result, the status module 508 can determine the display status 314 as "off" for presenting the navigation content 216 on the first user interface 418 of FIG. 4.

For a different example, if the navigation mode 302 represents the display mode 306, the navigation content 216 can represent the visual output, the audio output, or a combination thereof. As a result, the status module 508 can determine the display status 314 as "on" for presenting the navigation content 216 on the first user interface 418.

For further example, the status module 508 can determine the display status 314 based on the travel profile 202. More specifically, the travel profile 202 can include the navigation complexity 224 of "complex." Based on the navigation complexity 224, the status module 508 can determine the display status 314 to represent "on" or "off." Continuing with the example, the status module 508 can determine the display status 314 to represent "on" for presenting the navigation content 216. The status module 508 can communicate the display status 314 to a resource module 510.

The navigation system 100 can include the resource module 510, which can couple to the status module 508. The resource module 510 determines the resource level 234 of FIG. 2. For example, the resource module 510 can determine the resource level 234 based on the consumption rate 242 of FIG. 2.

More specifically, the consumption rate 242 can represent the usage of battery for operating the first device 102. The resource module 510 can determine the resource level 234 representing the remaining battery level of the device resource 236 of FIG. 2 representing the battery. The resource module 510 can communicate the resource level 234 to a prediction module 512.

The navigation system 100 can include the prediction module 512, which can couple to the resource module 510. The prediction module 512 determines the resource prediction 250 of FIG. 2. For example, the prediction module 512 can determine the resource prediction 250 based on the resource level 234, the consumption profile 240 of FIG. 2, the travel context 252, or a combination thereof.

The prediction module 512 can determine the resource prediction 250 in a number of ways. For example, the consumption profile 240 can include the resource age 244 of FIG. 2, the device type 246 of FIG. 2, the usage pattern 248 of FIG. 2, or a combination thereof. The prediction module 512 can determine the resource prediction 250 based on comparing the resource level 234 relative to the resource age 244, the device type 246, the usage pattern 248, or a combination thereof.

For a specific example, the prediction module 512 can determine the resource prediction 250 based on the resource level 234 relative to the resource age 244. More specifically, based on the resource age 244, the prediction module 512 can determine the consumption rate 242 of the device resource 236. The prediction module 512 can determine the resource prediction 250 based on the current instance of the resource level 234 relative to the consumption rate 242 for the device resource 236 with the resource age 244.

For a different example, the prediction module 512 can determine the resource prediction 250 based on the device type 246 of the first device 102. Based on the device type 246, the resource level 234 of the device resource 236 can differ. For example, the device type 246 representing a tablet can have a greater capacity for the device resource 236 than the device resource 236 for the device type 246 representing a smartphone. Based on the device type 246, the prediction module 512 can determine the resource prediction 250 for the resource level 234 available for traversing the travel route 208.

For another example, the prediction module 512 can determine the resource prediction 250 based on the usage pattern 248. For example, the usage pattern 248 can indicate the activity history, habit, or a combination thereof of the user using the first device 102. More specifically, the user can frequently operate the first device 102 for functionalities other than the functionalities provided for the navigation system 100. For example, the user can frequently check email, social network service, news, weather, or a combination thereof during the traversal of the travel route 208.

Based on the usage pattern 248, the prediction module 512 can determine the resource prediction 250 from the past instances of the consumption rate 242 for operating the first device 102. As a result, the prediction module 512 can determine the resource prediction 250 for traversing the travel distance 210.

For a different example, the prediction module 512 can determine the resource prediction 250 based on the travel context 252. More specifically, the prediction module 512 can determine the resource prediction 250 based on the navigation complexity 224. If the navigation complexity 224 is "complex," the navigation system 100 may require the first device 102 to allocate more resource to present the navigation content 216.

The consumption rate 242 for the device resource 236 when the navigation complexity 224 is "complex" can be greater than the consumption rate 242 for the device resource 236 when the navigation complexity 224 is "simple." More specifically as an example, the navigation system 100 can push for more instances of the navigation content 216 to the first device 102 to inform the user more frequently for what lies ahead in the user's travel. As a result, if the navigation complexity 224 represents "complex," the prediction module 512 can determine the resource prediction 250 to be less than if the navigation complexity 224 represents "simple." The prediction module 512 can communicate the resource prediction 250 to an update module 514.

The navigation system 100 can include the update module 514, which can couple to the prediction module 512. The update module 514 updates the display status 314, the navigation mode 302, or a combination thereof. For example, the update module 514 can update the display status 314 based on the travel context 252, the resource prediction 250, the navigation mode 302, the resource level 234, or a combination thereof. For another example, the update module 514 can update the navigation mode 302 based on the display status 314 being updated.

The update module 514 can update the display status 314 in a number of ways. For example, the update module 514 can update the display status 314 based on a variety of the instances of the travel context 252. For example, the display status 314 can represent "off." The travel context 252 can represent that the user is at a stop light and will be making a U-turn in 0.2 miles.

Based on the display status 314 and the travel context 252, the update module 514 can update the display status 314 to "on" for providing the upcoming instance of the navigation content 216. After the display status 314 is updated to "on," the update module 514 can update the navigation mode 302 from the audio mode 308 to the display mode 306 for presenting the navigation maneuver 212 representing the U-turn.

For another example, the update module 514 can update the display status 314 based on the travel distance 210 between one instance of the navigation maneuver 212 to another instance of the navigation maneuver 212. The navigation maneuver 212 can represent a turn. More specifically, the update module 514 can update the display status 314 based on the travel distance 210 between the turns meeting or exceeding the distance threshold 214 of FIG. 2.

As an example, the display status 314 can represent "on." If the travel distance 210 is below the distance threshold 214, the display status 314 can remain "on. In contrast, if the travel distance 210 meets or exceeds the distance threshold 214, the update module 514 can update the display status 314 to "off." For further example, the update module 514 can update the navigation mode 302 from the display mode 306 to the audio mode 308 for conserving the resource level 234.

For another example, the update module 514 can update the display status 314, the navigation mode 302, or a combination thereof based on the user failing to perform the navigation maneuver 212 indicated on the navigation content 216. The display status 314 can represent "off." Based on the missed instance of the navigation maneuver 212, the update module 514 can update the display status 314 to "on," the navigation mode 302 from the audio mode 308 to the display mode 306, or a combination thereof. For further example, the display status 314 can be kept as "on" while the navigation system 100 recalculates the navigation maneuver 212 based on the previous missed instance of the navigation maneuver 212.

For a different example, the update module 514 can update the display status 314 based on the travel distance 210 to the waypoint 206. More specifically, the update module 514 can increase the display time 316 of FIG. 3 based on if the travel distance 210 to the waypoint 206 is below the distance threshold 214. More specifically, the update module 514 can prolong the display time 316 of the navigation content 216 if the user is getting close to the waypoint 206.

For another example, the update module 514 can update the display status 314 based on the travel speed 230 of FIG. 2. The display status 314 can represent "off" while the travel speed 230 is greater the speed threshold 232 of FIG. 2. The speed threshold 232 can represent 6 kilometers per hour. If the travel speed 230 is below the speed threshold 232, the update module 514 can update the display status 314 from "off" to "on." The scenario can be vice versa where the update module 514 can update the display status "from "on" to off" if the travel speed 230 meets or exceeds the speed threshold 232. For further example, the update module 514 can update the navigation mode 302 from the audio mode 308 to the display mode 306.

For a different example, the update module 514 can update the display status 314 based on the predefined time 318 of FIG. 3. For example, the predefined time 318 can represent 15 minutes. Based on the predefined time 318, the update module 514 can update the display status 314 from "on" to "off" or vice versa.

For another example, the update module 514 can update the display status 314 based on the traffic condition 222 of FIG. 2. More specifically, the traffic condition 222 can represent congestion, accident, weather alert, or a combination thereof. Based on the traffic condition 222, the update module 514 can update the display status 314 from previous instance to another instance of the display status 314. The navigation mode 302 can also be updated from previous instance to another instance of the navigation mode 302.

For another example, the update module 514 can update the display status 314 based on the user entry 310 of FIG. 3 representing the gesture type 312 of FIG. 3 performed on the first device 102. For example, the gesture type 312 can represent picking up the first device 102. The first device 102 can include the detecting sensor 330 of FIG. 3 representing a gyroscope to detect the change in the orientation of the first device 102. Based on the change in the orientation, the update module 514 can update the display status 314 from "off" to "on" or vice versa.

For further example, the update module 514 can update the display status 314 based on the first user interface 418 detecting a contact from the gesture type 312 of tap on the first user interface 418. The update module 514 can update the display status 314 based on the user entry 310 representing an oral command. More specifically, the user entry 310 can represent a predefined phrase to activate the first device 102. Based on the user entry 310 including the oral command, the update module 514 can update the display status 314 from "off" to "on."

For a different example, the update module 514 can also update the display status 314 based on detecting the user's face is within the proximity threshold 322 of FIG. 3. More specifically, the first device 102 can include the detecting sensor 330 representing a proximity sensor to detect whether an object is within the proximity threshold 322. As an example, if the proximity sensor detects that the user distance 320 of FIG. 3 of the user's face is within the proximity threshold 322, the update module 514 can update the display status 314. Furthermore, if the user distance 320 is within the proximity threshold 322, the user's view for the first user interface 418 can be obscured. As a result, the update module 514 can update the display status 314 from "on" to "off."

For another example, the update module 514 can update the display status 314 based on the user's bioindicator 334 of FIG. 3. The user's bioindicator 334 can represent an electric field from the user's body, the user's voice, the user's body heat, the user's heartbeat, or a combination thereof. The update module 514 can update the display status 314 based on a failure to detect the user's bioindicator 334.

For a different example, the update module 514 can update the display status 314 based on the user's condition 324 of FIG. 3. The user's condition 324 can represent whether the user is asleep or not. More specifically as an example, the driver or occupant can be in a self-driving vehicle. The self-driving vehicle can include the detecting sensor 330. The detecting sensor 330 can detect, for example, the user's breathing pattern to determine whether the user is asleep or not. Based on the user's condition 324, the update module 514 can update the display status 314.

For another example, the update module 514 can update the display status 314 based on the travel context 252 representing the luminosity level 326 of FIG. 3 surrounding the first device 102. More specifically, if the luminosity level 326 is below the luminosity threshold 328 of FIG. 3, the update module 514 can update the display status 314 from "on" to "off." In contrast, if the luminosity level 326 meets or exceeds the luminosity threshold 328, the update module 514 can update the display status 314 from "off" to "on."

For a different example, the update module 514 can update the display status 314 based on the resource prediction 250. As discussed above, the resource prediction 250 can indicate the resource level 234 at the future location 220 of FIG. 2 of the first device 102. More specifically, as an example, the resource level 234 at the current location 218 can represent the resource level 234 of 100% capacity for the device resource 236. However, the resource prediction 250 can indicate that the resource level 234 will be at 6% capacity when the future location 220 is within the distance threshold 214 from the waypoint 206 representing a target destination.

To preserve the resource level 234 at the end of the user's travel, the update module 514 can update the display status 314 by turning "on" or "off" the first user interface 418 for conserving the resource level 234 available for the device resource 236. For another example, the update module 514 can update the display status 314 by changing the framerate of the display of the first user interface 418 conserve the resource level 234. More specifically as an example, the update module 514 can update the display status 314 by increasing or decreasing the framerate of the first user interface 418.

For further example, the update module 514 can update the display status 314 based on comparing the resource level 234, the resource prediction 250, or a combination thereof to the resource threshold 238 of FIG. 2. More specifically, if the resource level 234, the resource prediction 250, or a combination thereof is below the resource threshold 238, the update module 514 can update the display status 314 from "off" to "on." In contrast, the update module 514 can update the display status 314 from "off" to "on" if the resource level 234, the resource prediction 250, or a combination thereof meets or exceeds the resource threshold 238.

For another example, the update module 514 can update the display status 314 based on the navigation complexity 224. More specifically, if the navigation complexity 224 represents "complex," the user may require the navigation content 216 to guide the user's travel. If the display status 314 represents "off," the update module 514 can update the display status 314 to "on" for presenting the navigation content 216.

It has been discovered that the navigation system 100 updating the display status 314 based on the resource prediction 250 improves the efficiency and safety of operating the navigation system 100, the first device 102, the vehicle, or a combination thereof. By updating the display status 314 based on the resource prediction 250, the navigation system 100 can conserve the resource level 234 of the device resource 236 for usage of the first device 102 in the future location 220. As a result, the navigation system 100 can provide a safer travel by allowing the user to prolong the usage of the first device 102, the navigation system 100, or a combination thereof for the user's travel.

In contrast, the navigation complexity 224 can represent "simple." The display status 314 can represent "on." To conserve the resource level 234 for the device resource 236, the resource prediction 250 for the future location 220, or a combination thereof, the update module 514 can update the display status 314 to "off." The update module 514 can communicate the display status 314 to a transfer module 516.

The navigation system 100 can include the transfer module 516, which can couple to the update module 514. The transfer module 516 transfers the content display 332 of FIG. 3. For example, the transfer module 516 can transfer the content display 332 from a device to another device.

The transfer module 516 can transfer the content display 332 in a number of ways. For example, the transfer module 516 can transfer the content display 332 from one instance of the first device 102 to another instance of the first device 102. More specifically, the transfer module 516 can transfer the content display 332 based on comparing the resource level 234 to the resource threshold 238. For a specific example, the transfer module 516 can transfer the content display 332 based on the resource level 234, the resource prediction 250, or a combination thereof is below the resource threshold 238.

It has been discovered that the navigation system 100 can improve the user's safety by transferring the content display 332 from one instance of the first device 102 to another instance of the first device 102. By transferring the content display 332 based on the resource level 234 relative to the resource threshold 238, the navigation system 100 can conserve the resource level 234 of the device resource 236. As a result, the navigation system 100 can provide a safer travel by allowing the user to prolong the usage of the first device 102, the navigation system 100, or a combination thereof for the user's travel.

The physical transformation from traversing the travel route 208 from the start location 204 to the waypoint 206 results in the movement in the physical world, such as people using the first device 102, the vehicle, or a combination thereof, based on the operation of the navigation system 100. As the movement in the physical world occurs, the movement itself creates additional information that is converted back into determining the resource level 234, the resource prediction 250, the display status 314, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the travel module 502, the context module 504, the mode module 506, the status module 508, the resource module 510, the prediction module 512, the update module 514, and the transfer module 516.

The first control unit 412 of FIG. 4 can execute the first software 426 for the travel module 502 to determine the travel profile 202. The first control unit 412 can execute the first software 426 for the context module 504 to determine the travel context 252. The first control unit 412 can execute the first software 426 for the mode module 506 to determine the navigation mode 302.

The first control unit 412 can execute the first software 426 for the status module 508 to determine the display status 314. The first control unit 412 can execute the first software 426 for the resource module 510 to determine the resource level 234. The first control unit 412 can execute the first software 426 for the prediction module 512 to determine the resource prediction 250.

The first control unit 412 can execute the first software 426 for the update module 514 to update the display status 314, the navigation mode 302, or a combination thereof. The first control unit 412 can execute the first software 426 for the transfer module 516 to transfer the content display 332.

The second software 442 of FIG. 4 of the first device 106 of FIG. 4 can include the modules for the navigation system 100. For example, the second software 442 can include the travel module 502, the context module 504, the mode module 506, the status module 508, the resource module 510, the prediction module 512, the update module 514, and the transfer module 516.

The second control unit 434 of FIG. 4 can execute the second software 442 for the travel module 502 to determine the travel profile 202. The second control unit 434 can execute the second software 442 for the context module 504 to determine the travel context 252. The second control unit 434 can execute the second software 442 for the mode module 506 to determine the navigation mode 302.

The second control unit 434 can execute the second software 442 for the status module 508 to determine the display status 314. The second control unit 434 can execute the second software 442 for the resource module 510 to determine the resource level 234. The second control unit 434 can execute the second software 442 for the prediction module 512 to determine the resource prediction 250.

The second control unit 434 can execute the second software 442 for the update module 514 to update the display status 314, the navigation mode 302, or a combination thereof. The second control unit 434 can execute the second software 442 for the transfer module 516 to transfer the content display 332.

The modules of the navigation system 100 can be partitioned between the first software 426 and the second software 442. The second software 442 can include the context module 504, the mode module 506, the status module 508, the resource module 510, the prediction module 512, and the update module 514. The second control unit 434 can execute modules partitioned on the second software 442 as previously described.

The first software 426 can include the travel module 502 and the transfer module 516. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the travel profile 202, the travel context 252, the navigation mode 302, the display status 314, the resource level 234, the resource prediction 250, the content display 332, or a combination thereof to or from the second device 106. The first control unit 412 can operate the first software 426 to operate the location unit 420 of FIG. 4. The second control unit 434 can operate the second communication interface 450 of FIG. 4 to communicate the travel profile 202, the travel context 252, the navigation mode 302, the display status 314, the resource level 234, the resource prediction 250, the content display 332, or a combination thereof to or from the first device 102 through the communication path 104 of FIG. 4.

The first control unit 412 can operate the first user interface 418, the second user interface 438 of FIG. 4, or a combination thereof to display the start location 204, the waypoint 206, the travel route 208, the navigation content 216, a geographic region, or a combination thereof. More specifically, the first user interface 418, the second user interface 438, or a combination thereof can display the digital depiction of the start location 204, the waypoint 206, the travel route 208, the navigation content 216, a geographic region, or a combination thereof to represent the physical world.

The navigation system 100 describes the module functions or order as an example. The modules can be partitioned differently. For example, the travel module 502 and the context module 504 can be combined. Each of the modules can operate individually and independently of the other modules. Furthermore, data generated in one module can be used by another module without being directly coupled to each other. For example, the update module 514 can receive the display status 314 from the status module 508. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
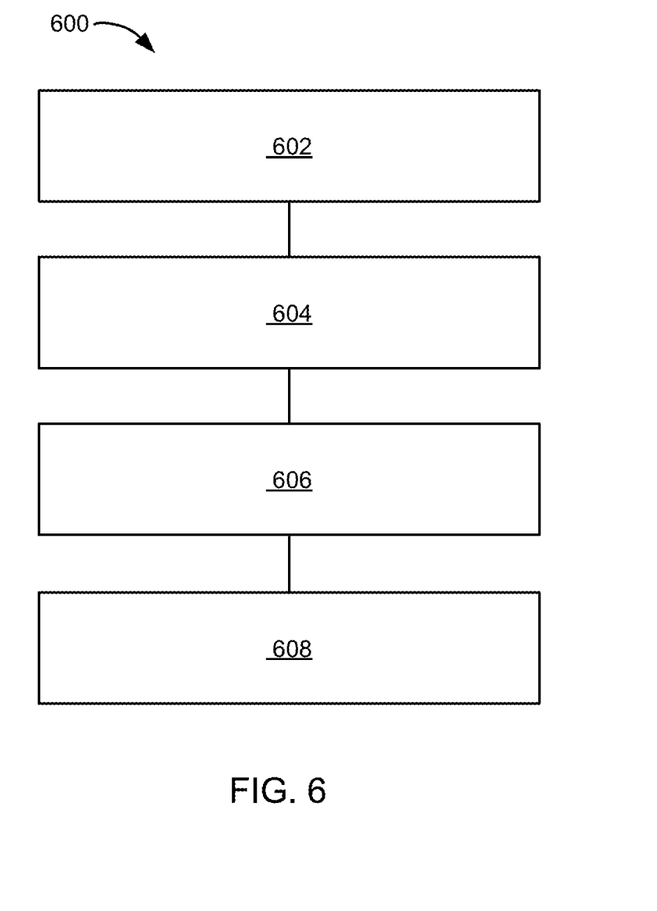
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a travel profile including a navigation complexity in a block 602; determining a display status with a control unit based on the travel profile in a block 604; determining a resource prediction based on the navigation complexity in a block 606; and updating the display status based on the resource prediction for presenting a navigation content on a device in a block 608.

It has been discovered that the navigation system 100 determining the travel profile 202 of FIG. 2 including the navigation complexity 224 improves the efficiency for conserving the resource level 234 of FIG. 2 of the device resource 236 of FIG. 2 for traveling the travel route 208 of FIG. 2. By determining the travel profile 202, the navigation system 100 can determining the display status 314 of FIG. 3 for turning the first user interface 418 of FIG. 4 "on" or "off" Furthermore, the navigation system 100 can determine the resource prediction 250 of FIG. 2 based on the navigation complexity 224 to optimize the presentation of the navigation content 216 of FIG. 2. As a result, the navigation system 100 can update the display status 314 to use the for a safer operation of the navigation system 100, the first device 102, the vehicle, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
determining a travel profile including a navigation complexity indicating an intricacy level of a travel route when a turn count meets or exceeds a turn threshold representing a limit for a number of turns wherein the turn threshold is increased relative to an increase in a travel distance and the turn threshold is decreased relative to a decrease in the travel distance;
determining a display status based on the travel profile;
determining a resource prediction with a control unit based on the navigation complexity of the travel profile;
actuating the control unit based on the resource prediction for turning on or off a display interface to conserve a resource level; and
updating the display status based on the resource prediction and the travel distance between one instance of a navigation maneuver and another instance of the navigation maneuver meeting or exceeding a distance threshold, the navigation maneuver representing a user's action including a failure to perform the navigation maneuver indicated on a navigation content for presenting on a device.

2. The method as claimed in claim 1 wherein updating the display status includes updating the display status based on a travel context for traveling the travel route.

3. The method as claimed in claim 1 wherein updating the display status includes updating the display status based on performing the navigation maneuver for traveling the travel route.

4. The method as claimed in claim 1 wherein updating the display status includes updating the display status based on the resource prediction for conserving the resource level available at a future location.

5. The method as claimed in claim 1 wherein updating the display status includes updating the display status based on the travel distance to a waypoint for changing a display time of the navigation content.

6. The method as claimed in claim 1 further comprising transferring a content display based on comparing the resource level to a resource threshold for conserving a device resource.

7. The method as claimed in claim 1 wherein determining the travel profile includes determining the navigation complexity based on comparing the turn count to the turn threshold within the travel distance.

8. The method as claimed in claim 1 further comprising determining a navigation mode based on the navigation complexity for traversing the travel route.

9. The method as claimed in claim 1 wherein determining the resource prediction includes determining the resource prediction based on comparing the resource level relative to a resource age for conserving a device resource.

10. The method as claimed in claim 1 wherein determining the resource prediction includes determining the resource prediction based on a usage pattern of a consumption rate for traversing the travel route.

11. A navigation system comprising:
a control unit including a processor for:
determining a travel profile including a navigation complexity indicating an intricacy level of a travel route when a turn count meets or exceeds a turn threshold representing a limit for a number of turns wherein the turn threshold is increased relative to an increase in a travel distance and the turn threshold is decreased relative to a decrease in the travel distance,
determining a display status based on the travel profile,
determining a resource prediction based on the navigation complexity of the travel profile,
actuating the control unit based on the resource prediction for turning on or off a display interface to conserve a resource level, and
updating the display status based on the resource prediction and the travel distance between one instance of a navigation maneuver and another instance of the navigation maneuver meeting or exceeding a distance threshold, the navigation maneuver representing a user's action including a failure to perform the navigation maneuver indicated on a navigation content, and a communication unit including a microelectronic, coupled to the control unit, for transmitting the display status for presenting the navigation content on a device.

12. The system as claimed in claim 11 wherein the control unit is for updating the display status based on a travel context for traveling the travel route.

13. The system as claimed in claim 11 wherein the control unit is for updating the display status based on performing the navigation maneuver for traveling the travel route.

14. The system as claimed in claim 11 wherein the control unit is for updating the display status based on the resource prediction for conserving the resource level available at a future location.

15. The system as claimed in claim 11 wherein the control unit is for updating the display status based on the travel distance to a waypoint for changing a display time of the navigation content.

16. A non-transitory computer readable medium including instructions for execution by one or more processors, cause the one or more processors to perform a method, the method comprising:
determining a travel profile including a navigation complexity indicating an intricacy level of a travel route when a turn count meets or exceeds a turn threshold representing a limit for a number of turns wherein the turn threshold is increased relative to an increase in a travel distance and the turn threshold is decreased relative to a decrease in the travel distance;
determining a display status based on the travel profile;
determining a resource prediction with a control unit based on the navigation complexity of the travel profile;
actuating the control unit based on the resource prediction for turning on or off a display interface to conserve a resource level; and
updating the display status based on the resource prediction and the travel distance between one instance of a navigation maneuver and another instance of the navigation maneuver meeting or exceeding a distance threshold, the navigation maneuver representing a user's action including a failure to perform the navigation maneuver indicated on a navigation content for presenting on a device.

17. The non-transitory computer readable medium as claimed in claim 16 wherein updating the display status includes updating the display status based on a travel context for traveling the travel route.

18. The non-transitory computer readable medium as claimed in claim 16 wherein updating the display status includes updating the display status based on performing the navigation maneuver for traveling the travel route.

19. The non-transitory computer readable medium as claimed in claim 16 wherein updating the display status includes updating the display status based on the resource prediction for conserving the resource level available at a future location.

20. The non-transitory computer readable medium as claimed in claim 16 wherein updating the display status includes updating the display status based on the travel distance to a waypoint for changing a display time of the navigation content.

* * * * *